May 29, 1962 D. J. ARNEBERG 3,037,154

ENCLOSURE

Filed Oct. 22, 1958 2 Sheets-Sheet 1

INVENTOR.
DON J. ARNEBERG
BY
William H. Schmeling

May 29, 1962 D. J. ARNEBERG 3,037,154

ENCLOSURE

Filed Oct. 22, 1958 2 Sheets-Sheet 2

INVENTOR.
DON J. ARNEBERG
BY

United States Patent Office 3,037,154 Patented May 29, 1962

3,037,154
ENCLOSURE

Don J. Arneberg, Milwaukee, Wis., assignor to Square D Company, Park Ridge, Ill., a corporation of Michigan
Filed Oct. 22, 1958, Ser. No. 769,028
13 Claims. (Cl. 317—120)

This invention relates to enclosures and is more particularly concerned with mounting arrangements for electrical devices which are included in a dust tight, weather tight enclosure that is particularly suited for use in hazardous locations and is a continuation in part of application Serial Number 727,892, filed April 11, 1958 and now abandoned.

When electrical devices, such as relays, starters, contactors and the like are used in explosive environments, they are usually mounted in enclosures which will confine the flames and withstand the pressures of the rapidly expanding gases which accompany an explosion.

It is an object of the present invention to provide an enclosure which possesses certain new and novel features which enclosure is particularly suited for mounting electrical devices in an environment susceptible to explosions.

Another object of the present invention is to provide a novel support arrangement for the electrical devices in an explosion proof or resistant enclosure.

A further object of the present invention is to provide an enclosure which is particularly suited for use in explosive atmospheres with an arrangement for mounting electrical devices therein that comprehends a means for guiding and supporting the electrical devices in position in annular openings in a member prior to the securement of the devices to the member and to the closure of the openings by other portions of the enclosure.

A still further object of the present invention is to provide the center section of an explosion proof or explosion resistant enclosure with parallel spaced fixed rails which are secured internally in and extend externally to the center section through openings in the center section. The invention further comprehends the use of the fixed rails as a support for the electrical devices which are enclosed by the enclosure when a pair of spaced parallel rails on which the electrical devices are mounted are slidingly moved on the fixed rails into a position where the device carrying rails are held suspended by pins on the fixed rails to permit fastening screws to be applied to secure the device carrying rails to the fixed rails from a point external to the center section before the top and bottom sections of the enclosure are threadingly applied to externally threaded flanges which surround the openings in the center section.

It is another object of the present invention to provide the enclosure according to the present invention with interchangeable top and bottom covers and to provide a drip ring or rib on the center section to prevent moisture from flowing from the side walls of the center section to the threaded portions on the bottom wall of the center section.

Another object of the present invention is to provide an enclosure for electrical devices which enclosure has a center section formed with openings in its top and bottom surfaces which are surrounded with extending externally threaded identical flanges and which center section provides a novel support for electrical devices which are to be included within the enclosure and has a drip ring formed along the bottom surface to prevent moisture flow from the side walls of the center section to the threaded flange in the bottom wall, while the upwardly extending flange on the top surface prevents fluid movement from the top surface into the interior of the enclosure, said enclosure also including a pair of cover members each of which is substantially bell-jar shape and has an internally threaded flange adjacent the mouth end which flanges are identical and arranged to threadedly engage either of the externally threaded flanges and which members each have a plurality of lugs outwardly extending from the external surface of the members adjacent the internally threaded flange portions for providing points of purchase for tightening and loosening the threaded engagement between the members and center section.

Further objects and features of the invention will be readily apparent to those skilled in the art from the specification and appended drawing which illustrates a preferred embodiment in which.

Figure 2:
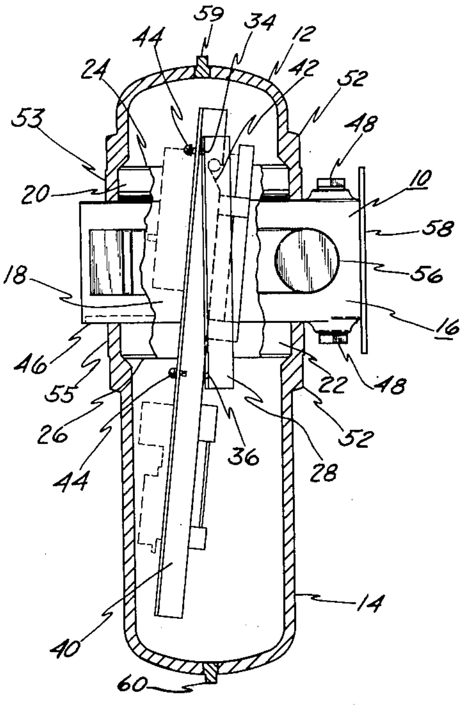
FIG. 2 is a view showing the device in FIG. 1 with the top and bottom sections of the enclosure shown in section and the center section having a portion partly broken away to illustrate the mounting arrangement for electrical devices within the enclosure.
Figure 5:
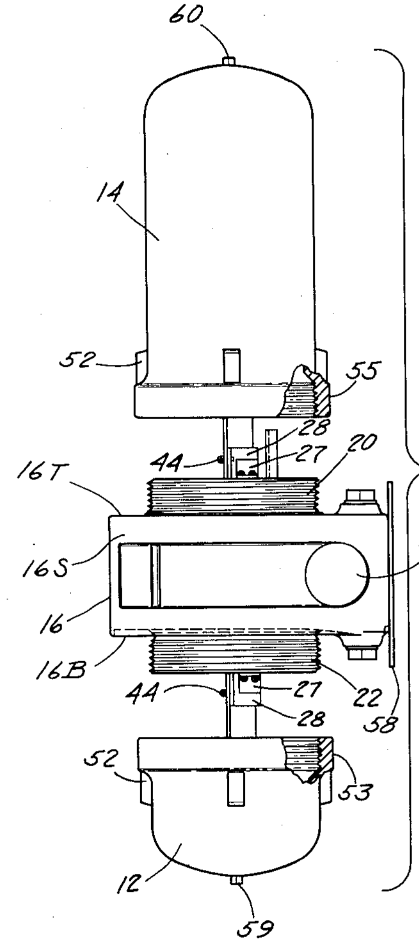

FIG. 5 is a side view of the device in FIG. 2 before the covers are applied to the center section and particularly illustrating the interchangeability of the top and bottom covers, the electrical devices as secured in the center section, the arrangement of the internally and externally threaded flanges on the covers and center section and the external shape and arrangement of the center section, the covers and the lugs on the covers which will provide points of purchase during assembly and disassembly of the covers on the center section.

In the drawings, numeral 10 is used to designate an enclosure for electrical devices that is particularly suited for use in explosive atmospheres. The design of this enclosure is more particularly shown in detail in the design application, Serial No. D. 50,445, filed April 11, 1958, which has been assigned to the assignee of the present invention, and is now Patent No. D. 185,256.

The enclosure 10 basically includes a bell shaped section 12, and a bell shaped section 14, and the center or collar section 16. Each of these sections are preferably formed of a suitable material, such as cast aluminum, which is relatively light in weight and possesses the necessary tensile strength to withstand the explosions which may occur because of the explosive gases contained within the enclosure 10 as the result of the opening and closing of the contacts of the electrical devices included within the enclosure 10.

Figure 1:
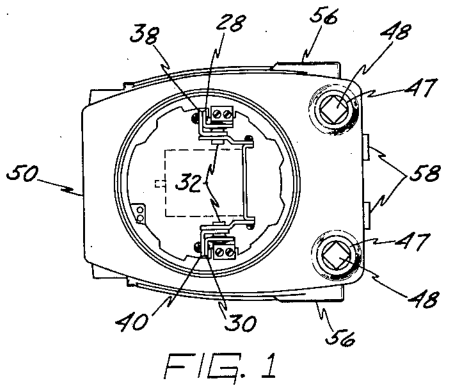
FIG. 1 is a top plan view of the enclosure according to the present invention with the top section of the enclosure removed.

The top surface 16T and bottom surface 16B are preferably horizontally disposed and maintained in spaced relation by the vertically extending side walls 16S of the center section 16. The surfaces 16B and 16T together with the side walls 16S define and provide a hollow interior or chamber 18 within the center section 16. The top surface 16T is provided with an opening 24 therein; similarly, the bottom surfaces 16B is provided with an opening 26 therein, which opening is vertically aligned with the opening 24. The openings 24 and 26 expose the chamber 18 in the interior of the center section 16. Surrounding the opening 24 in the top surface 16T is an upwardly extending externally threaded flange 20. Similarly surrounding opening 26 and downwardly extending from the bottom surface 16B is an externally threaded flange 22. The flanges 20 and 22 are preferably identical to permit the interchangeability of the top and bottom covers 12 and 14 as shown in FIGS. 1 and 5.

Figure 4:
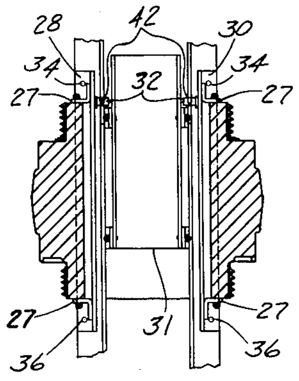
FIG. 4 is a sectional view taken along line 4—4 in FIG. 3.

Positioned in the interior of each of the openings 24 and 26 and integrally formed with section 16 are lugs which provide a securement for two pairs of angle brackets 27. These brackets 27 provide securement for a pair of parallel spaced fixed rails 28 and 30. The rails 28 and 30 are spaced as shown in FIGS. 1 and 4 and extend vertically as shown in FIGS. 2 and 4 with the end portions thereof projecting externally to both of the flanges 20 and 22. The rails preferably are formed angles of metal and each have pins 32 extending therefrom which project toward each other as in FIG. 4. The rails 28 and 30 further are each provided with threaded openings 34 located in the portions of the rails which project above the top flange 20 and threaded openings 36 located in the portions of the rails which extend beyond the bottom flange 22.

The support for the electrical devices, shown in phantom, comprising any suitable combination of relays, starters, contactors, etc., includes a pair of spaced movable rails 38 and 40 which are also formed angles of metal preferably complementary in shape to rails 28 and 30 and arranged in parallel to be received between the fixed guide rails 28 and 30. The rails 28 and 30 are preferably maintained in spaced relation by a web 31. Located adjacent the top of the rails 38 and 40 are notches or hooks 42 which are located to receive the pins 32. The rails 38 and 40 are sized and located to slide on the fixed rails 28 and 30. Thus, when the electrical devices are to be mounted within the center section, all that is required is that the rails 38 and 40 are slid upwardly along the fixed rails 28 and 30 into a predetermined position to permit the notches 34 to engage the pins 32. When the rails are thus positioned, the rails 38 and 40 will be suspended from the pins 32. After the parts are in the suspended position, a suitable fastening means, such as screws 44 may be inserted through suitably located openings in the rails 38 and 40 and threaded into the openings 34 and 36. In this connection it is to be noted that the openings 34 and 36 are located in a horizontal plane that is vertically spaced above and below the top flange 20 and the bottom flange 22 respectively as shown in FIG. 4 so that the securement of the rails 38 and 40 is accomplished without interference with the material which forms the center section 16. After the electrical components are thus positioned in the center section, the sections 12 and 14 may be threadedly positioned on either the flanges 20 and 22 to complete the enclosure for the electrical devices. The arrangement of the sections 12 and 14 on the center section will depend on the arrangement of the devices carried by rails 38 and 40.

Figure 3:
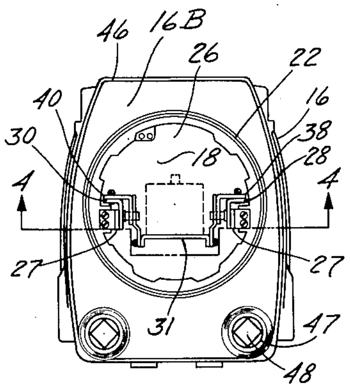
FIG. 3 is a bottom plan view of the enclosure according to the present invention with the bottom cover removed and particularly showing the drip rib or ring on the bottom surface.

The enclosure which is mounted by means of hangers 58 also includes a drip ring 46 which is integrally formed about the periphery or border of the bottom surface 16B where the side walls 16S and bottom surface 16B intersect as shown in FIGS. 3 and 5. The drip ring 46 which preferably comprises a raised rib will prevent fluid moisture from flowing downwardly along the side walls 16S and horizontally along the bottom wall 16B to the externally threaded flange 22. It is to be appreciated that this moisture flow, if not prevented, would carry and deposit grit and other particles of foreign material between the threads on flange 22 and the internally threaded flange on the sections 12 and 14 so as to impede the removal of the covers 12 or 14 from the center section 16 because of the presence of grit, etc., between the threads on which the moisture freezes during cold weather.

The center section also includes openings 47 shown as closed by plugs 48. These openings 47 are to be used to provide points of entry for the electrical conductors which are connected to the electrical devices located within the enclosure. If desired, the bosses 56 may also be bored and tapped for the passage of electrical conductors. The front surface 50 of the center section 16 is preferably flat to provide points of securement for name plates and other identifying descriptive and instructive emblems and mountings for handles, not shown, which may be used to actuate the devices within the enclosure.

The top and bottom sections 12 and 14 are preferably cylindrical with rounded ends as shown. The sections 12 and 14 are also tapped to provide threaded openings for plugs 59 and 60 which may be used to drain the enclosure 10 of moisture and other liquids and to provide a path for the passage of gases. Positioned on the exterior of the sections 12 and 14 adjacent the flanges 53 and 55 wherein the internal threads are located, are spaced lugs 52 which are used to provide points of purchase to facilitate making and breaking the threaded connections between the sections 12, 14 and 16. Another feature of the enclosure is that the top section 12 includes an internally threaded flange portion 53 to receive the externally threaded portions of the flange 20. Thus it will be seen that snow, ice, etc., will be prevented from entering the enclosure through the threaded junction between the top section 12 and the center section 16. The pressure of the drip ring will prevent the creepage of moisture along the bottom surface of the section 16 into the threaded portions between the internally threaded flange 55 of section 14 and the externally threaded portion of flange 22. Thus it is apparent that the enclosure 10 is substantially weather and explosion proof.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In an enclosure, the combination comprising; a member having a pair of spaced interconnected annular openings therein, a pair of spaced parallel member rails internally secured in the member and extending through the openings external to the member, a support for electrical devices having a pair of parallel spaced support rails arranged to slidingly engage the member rails, cooperating hooks and pins on the rails of the support and on the member for suspending the support rails on the member rails, means engageable with the support and member rails at points external to the member for securing the support rails to the member rails when the support rails are suspended on the member rails, and a threaded cover for each of the openings for cooperating with the member to enclose the rails and complete the enclosure when the rails are secured to each other.

2. In an enclosure, the combination comprising; a member having a pair of spaced interconnected annular openings therein, a pair of spaced parallel member rails internally secured in the member and extending through the openings external to the member, a support for electrical devices having a pair of parallel spaced support rails of greater length than the member rails and spaced to be received between and slidingly engage the member rails, cooperating hooks and pins on the rails of the support and on the member for suspending the support rails on the member rails, means engageable with the support and member rails at points external to the member for securing the support rails to the member rails when the support rails are suspended on the member rails, and a threaded cover for each of the openings for cooperating with the member to increase the rails and complete the enclosure when the rails are secured to each other.

3. In an enclosure, the combination comprising; a member having a pair of spaced interconnected openings therein, a pair of spaced parallel rails secured in said member and projecting through the openings external to the member, a pin on each of the rails disposed within the member, a support for electrical devices having a pair of parallel rails spaced for slidingly engaging the rails carried by the member, a hook portion formed in each of the support rails for engaging the pins, means engageable with both pairs of rails external to the member for securing the support rails to the rails carried by the member, and a threaded cover for each of said openings secured on the member for enclosing the rails and completing said enclosure.

4. In an enclosure, the combination comprising; a hollow member having a pair of spaced outwardly extending annular flanges externally threaded for providing a pair of interconnected openings therein, a pair of spaced parallel member rails internally secured in the member and projecting through the openings external to the flanges of the member, a pin on each of the rails disposed within the interior of the member, a support for electrical devices having a pair of parallel support rails spaced for slidingly engaging the member rails, a hook portion formed in each of the support rails for engaging the pins, means engageable with both pairs of rails external to the flanges of the member for securing the support rails to the rails carried by the member, and a threaded cover for each of said openings threadedly secured on the flanges of the member for enclosing the rails and the electrical devices supported thereby for completing said enclosure.

5. In an enclosure, the combination comprising; a cast member having a hollow interior with upwardly extending top and bottom externally threaded flanges defining an annular opening on the top and bottom of the member which extend into the hollow interior of the member, a pair of parallel spaced vertically extending rails secured in the interior of the member and having portions thereof extending through the top and bottom openings exterior to the flanges of the member, a device for supporting electrical devices within the enclosure having a pair of parallel rails of greater length than the rails carried by the member and spaced to be received between and slid on the rails carried by the member, means between the rails on the member and the rails of the device for suspending the device on the member when the rails are slidingly moved to a predetermined position relative to each other, and fastening means accessible from the exterior of the member for securing the rails together when the rails are in the suspended position, and a threaded cover for the bottom and top openings cooperating with the member to complete the enclosure and enclose the rails and electrical devices within the enclosure.

6. In an enclosure, the combination comprising; a cast member having a hollow interior with upwardly extending top and bottom externally threaded flanges defining an annular opening on the top and bottom of the member which extend into the hollow interior of the member, a pair of parallel spaced vertically extending fixed rails secured in the interior of the member and having portions thereof extending through the top and bottom openings exterior to the flanges of the member, a device for supporting electrical devices within the enclosure having a pair of parallel movable rails of greater length than the fixed rails and spaced to be received between and slid on the fixed rails, means including a pin on the fixed rails and notches on the movable rails for suspending the device in the openings when the movable rails are slidingly moved to a predetermined position on the fixed rails, and fastening means accessible from the exterior of the member for securing the movable rails to the fixed rails when the movable rails are in the suspended position, and a cover for each of the openings having internal threads to receive the external threads on the flanges and cooperating with the member to complete the enclosure and completely enclose the rails and electrical devices within the enclosure.

7. An enclosure for electrical devices comprising; a center section having spaced top and bottom surfaces each having an opening therein, an upstanding externally threaded flange surrounding the opening in the top surface, a depending externally threaded flange surrounding the opening in the bottom surface, each of said threaded flanges being substantially identical for threadedly receiving interchangeable internally threaded parts, a raised rib providing a border for the bottom surface arranged to prevent horizontal movement of moisture across the bottom surface toward the threaded flange on the bottom surface, and a pair of closure members each having an internally threaded portion receivable by either of the threaded flanges for completing the enclosure when the closure members are threadedly applied to the top and bottom flanges respectively.

8. An enclosure for electrical devices comprising; a pair of bell jar shaped members each having an internally threaded flange portion adjacent its open end and externally extending lugs adjacent the flange portion providing points of purchase when the members are threaded on another member, said internally threaded flanges being substantially identical making said members interchangeable, and a center section having; spaced substantially horizontally extending top and bottom walls interconnected by vertically extending side walls, said walls being arranged to provide an enclosed chamber and said top and bottom walls each having an opening therein which openings are substantially vertically aligned permitting entry into said chamber through the top and bottom walls, an extending externally threaded circular flange surrounding each of the openings, said flanges being identical and arranged to threadedly receive the internally threaded flange portions of either of said members, and a raised rib downwardly extending from the bottom wall for preventing horizontal movement of moisture across the bottom wall from the side walls.

9. An enclosure for electrical devices comprising; a center section having spaced substantially horizontally disposed top and bottom surfaces interconnected by vertically extending side walls, said bottom and top surfaces each having an opening therein surrounded by an externally threaded flange which are substantially identical for threadedly receiving interchangeable members, a raised rib extending from the bottom surface at the intersection of the bottom surface and the side walls for preventing movement of moisture from the side walls across the bottom surface to the flange on the bottom surface, and a pair of bell jar shaped members each having an internally threaded flange at the mouth end of the bell jar threadedly receivable by either of the externally threaded flanges and having spaced lugs externally extending adjacent the internally threaded flange for providing a purchase for facilitating the application and removal of the members on the center section.

10. An enclosure for electrical devices comprising; a center section having spaced substantially horizontally disposed top and bottom surfaces connected by substantially vertical side walls, said bottom and top surface each having an opening therein surrounded by an externally threaded flange, a rib downwardly extending from and providing a border for the bottom surface for preventing moisture movement between the side and bottom surfaces, a pair of internally threaded members each threadedly receivable by either of the threaded flanges for completing the enclosure when the members are threadedly applied to the flanges.

11. An enclosure for electrical devices comprising; a center section having spaced substantially horizontally disposed top and bottom surfaces separated by a side surface, each of said top and bottom surfaces having an opening therein surrounded by an extending externally threaded flange, said flanges being substantially identical for threadedly receiving interchangeable members, a raised rib extending from the bottom surface for preventing horizontal movement of moisture across the bottom surface from the side surface, and a pair of members of substantially bell jar shape each having an internally threaded portion adjacent the mouth end of the bell jar receivable on the threaded flange for completing the enclosure when the members are applied to the flanges.

12. In an enclosure of the character described, the combination comprising; a center section having spaced horizontally disposed top and bottom walls interconnected by side walls to provide a chamber, said top and bottom walls each having an opening therein which openings are vertically aligned for exposing said chamber from the top and bottom walls of the center section, an extending externally threaded flange surrounding each of said openings, said flanges being substantially identical, a pair of parallel spaced vertically extending fixed rails secured in said center section and having portions thereof extending through the top and bottom openings exterior to said flanges, a device for supporting electrical devices within the enclosure having a pair of parallel movable rails of greater length than the fixed rails and spaced to be received between and slidingly engage the fixed rails, means between the fixed and movable rails for suspending the device in the center section after the movable rails are moved to a predetermined position on the fixed rails, fastening means accessible exterior to the flanges for securing said movable rails to the fixed rails after the rails are in the suspended position, bell jar shaped covers for the top and bottom openings for enclosing the fixed and movable rails and the electrical devices carried thereby, said bell jar covers having internally threaded flanges adjacent the mouth end thereof which flanges are substantially identical and arranged so either of the covers may threadingly engage either of the externally threaded flanges, lugs extending externally on each of the covers adjacent the flange portions providing purchase points for moving the covers for making and breaking the threaded engagement between the covers and externally threaded flanges, and a projecting rib disposed between the bottom wall and side walls for preventing movement of moisture from the side walls to the threaded flange on the bottom wall.

13. In an enclosure, the combination comprising; a hollow member having a pair of spaced outwardly extending annular flanges externally threaded for providing a pair of interconnected openings therein, a pair of spaced parallel member rails internally secured in the member and projecting through the openings external to the flanges of the member, a pin on each of the rails disposed within the interior of the member, a support for electrical devices having a pair of parallel support rails spaced for slidingly engaging the member rails, a hook portion on each of the support rails for engaging the pins, means engageable with both pairs of rails external to the flanges of the member for securing the support rails to the rails carried by the member, and a cover for each of said openings threadedly secured on the flanges of the member for completing said enclosure and enclosing said rails, said flanges being identical whereby the covers may be interchanged on said member.

References Cited in the file of this patent

UNITED STATES PATENTS

| | | |
|---|---|---|
| 2,037,900 | Hastings | Apr. 21, 1936 |
| 2,156,564 | Hardage | May 2, 1939 |
| 2,223,539 | Baker | Dec. 3, 1940 |
| 2,321,508 | Olley | June 8, 1943 |
| 2,420,478 | Hasselhorn | May 13, 1947 |
| 2,470,037 | Liddle | May 10, 1949 |

UNITED STATES PATENT OFFICE
CERTIFICATE OF CORRECTION

Patent No. 3,037,154 May 29, 1962

Don J. Arneberg

It is hereby certified that error appears in the above numbered patent requiring correction and that the said Letters Patent should read as corrected below.

Column 4, line 19, for "pressure" read -- presence --.

Signed and sealed this 6th day of November 1962.

(SEAL)
Attest:

ERNEST W. SWIDER
Attesting Officer

DAVID L. LADD
Commissioner of Patents